United States Patent
Parsons et al.

(10) Patent No.: US 6,970,906 B1
(45) Date of Patent: Nov. 29, 2005

(54) VOICE MAIL CALLER IDENTIFICATION

(75) Inventors: Eric W. Parsons, Ashton (CA); Steven M. Armstrong, Nepean (CA); Sylvain S. Huppe, Woodlawn (CA)

(73) Assignee: Nortel Networks Limited, (CA)

( * ) Notice: Subject to any disclaimer, the term of this patent is extended or adjusted under 35 U.S.C. 154(b) by 766 days.

(21) Appl. No.: 09/753,025

(22) Filed: Dec. 29, 2000

Related U.S. Application Data

(60) Provisional application No. 60/244,985, filed on Oct. 30, 2000.

(51) Int. Cl.[7] .................................. G06F 13/00
(52) U.S. Cl. ...................................... 709/204
(58) Field of Search ................. 340/7.1, 7.2, 7.5, 340/7.51, 7.52, 7.58, 7.59, 7.6, 7.61, 7.62, 340/825.36; 709/200, 206, 207, 204, 205

(56) References Cited

U.S. PATENT DOCUMENTS 6,628,194 B1 * 9/2003 Hellebust et al. ............ 340/7.5

* cited by examiner

Primary Examiner—Robert B. Harrell
(74) Attorney, Agent, or Firm—Steubing McGuinness & Manaras LLP

(57) ABSTRACT

A notification system for providing unified alerts about messages left for a user in a communication system is coupled to a voice mail service in an office. When voice mail messages are left for a user, the voice mail service sends header information about the new message to the notification system. The notification system sends a notification of the new messages to a wireless device configured and selected by the user for receiving message notifications. Depending on the type of wireless device, the notification may include a link to a dialer application with which the wireless device can be connected to the voice mail service for selectively listening to the messages of interest. From the new message, the notification system may further extract information about the message sender, and use it to attempt to retrieve the sender's name from the user's personal contact list, for example. This information can then be included in the message header information sent to the user.

25 Claims, 4 Drawing Sheets

VOICE MAIL CALLER IDENTIFICATION

CROSS-REFERENCE TO RELATED APPLICATIONS

The present application is based on, and claims priority from, U.S. Appln. No. 60/244,985, filed Oct. 30, 2000 and entitled METHOD AND SYSTEM FOR PROVIDING SELECTIVE ACCESS TO ENTERPRISE MESSAGES FROM A REMOTE DEVICE, commonly owned by the present assignee, the contents of which are incorporated herein by reference.

The present application is related to U.S. applications No. 09/753,340, now abandoned, entitled METHOD AND SYSTEM FOR PROVIDING UNIFIED COMMUNICATION MANAGEMENT BASED ON PRESENCE INFORMATION, Ser. No. 09/743,333, entitled METHOD AND APPARATUS FOR MANAGING COMMUNICATIONS BASED ON CALLER IDENTIFICATION AND CATEGORIZATION, Ser. No. 09/753,334, now abandoned, entitled METHOD AND SYSTEM FOR PROVIDING ENTERPRISE MESSAGE NOTIFICATION TO A REMOTE DEVICE WITH RESPONSE ENABLEMENT, Ser. No. 09/753,124, now pending, entitled METHOD AND SYSTEM FOR PROVIDING UNIFIED WAP ALERTS and Ser. No. 09/753,345, now pending, entitled METHOD AND SYSTEM FOR PROVIDING REMOTE ACCESS TO PREVIOUSLY TRANSMITTED ENTERPRISES MESSAGES, all filed Dec. 29, 2000 and commonly owned by the assignee of the present invention, the contents of each being fully incorporated herein by reference.

FIELD OF THE INVENTION

This invention relates generally to personal communications and messaging, and more particularly, to a system and method for providing selective access to enterprise voice mail messages from a remote device.

BACKGROUND OF THE INVENTION

Private Branch Exchanges (PBXs) and voice mail systems are ubiquitous in offices around the world. Their capabilities for providing access to messages are, however, rigidly fixed and quite limited. For example, a typical PBX system may provide a user with a voice mail box and allow the user to access messages in the mail box by calling a number within the PBX. Some systems allow users to access messages in their mail box when they are away from the office by dialing a phone number through the Public Switched Telephone Network (PSTN). In either event, access to individual voice mail messages, if there are several, can be quite time-consuming as the user has to listen through each message from the first to the last, many of which may not be of much importance to the user. There is no way for the user to know ahead of time which message in a group of messages are important unless the user has already listened to all the messages. Further, unless the user deletes messages, they will accumulate in the user's mail box, thus making the process of finding important messages even more problematic and time-consuming.

Meanwhile, as workers become more mobile, remote access to voice mail becomes more important. However, the problems inherent in conventional voice mail systems, coupled with the demands of attending to business tasks while away from the office, make the experience of accessing messages even more unpleasant.

SUMMARY OF THE INVENTION

The present invention relates to a method and system for personalized and selective remote access to enterprise messages.

In one example of the invention, a notification system is coupled to a voice mail service in an office. When voice mail messages are left for a user, the voice mail service sends header information about the new message to the notification system (caller's phone number, time received, length of message, etc.). The notification system sends a notification of the new messages (or perhaps only a subset thereof, in accordance with preferences established by the user) to a wireless device configured and selected by the user for receiving message notifications. Because the user is provided header information concerning voice mail messages, the user can determine which messages may be of most interest. Depending on the type of wireless device, the notification may include a link to a dialer application with which the wireless device (e.g. WAP-enabled cell phone) can be connected to the voice mail service for selectively listening to the messages of interest. From the new message, the notification system may further extract information about the message sender, and use it to attempt to retrieve the sender's name from the user's personal contact list, for example. This information can then be included in the message header information sent to the user.

In accordance with an aspect of the invention, a method for managing messages provided to a user in an enterprise includes receiving header information concerning a new message associated with the user in the enterprise, updating a list of message information for the user based on the received header information, preparing a notification based on the updated list of message information, and sending the notification to a wireless device associated with the user.

In accordance with another aspect of the invention, an apparatus for managing messages in an enterprise including a messaging system adapted to store voice mail messages of callers to a user includes a notification server adapted to be coupled to the messaging system for receiving header information regarding new voice mail messages associated with the user, the notification server being adapted to maintain a list of voice mail messages in accordance with the received header information and to send a notification based on the maintained list to a wireless device associated with the user.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
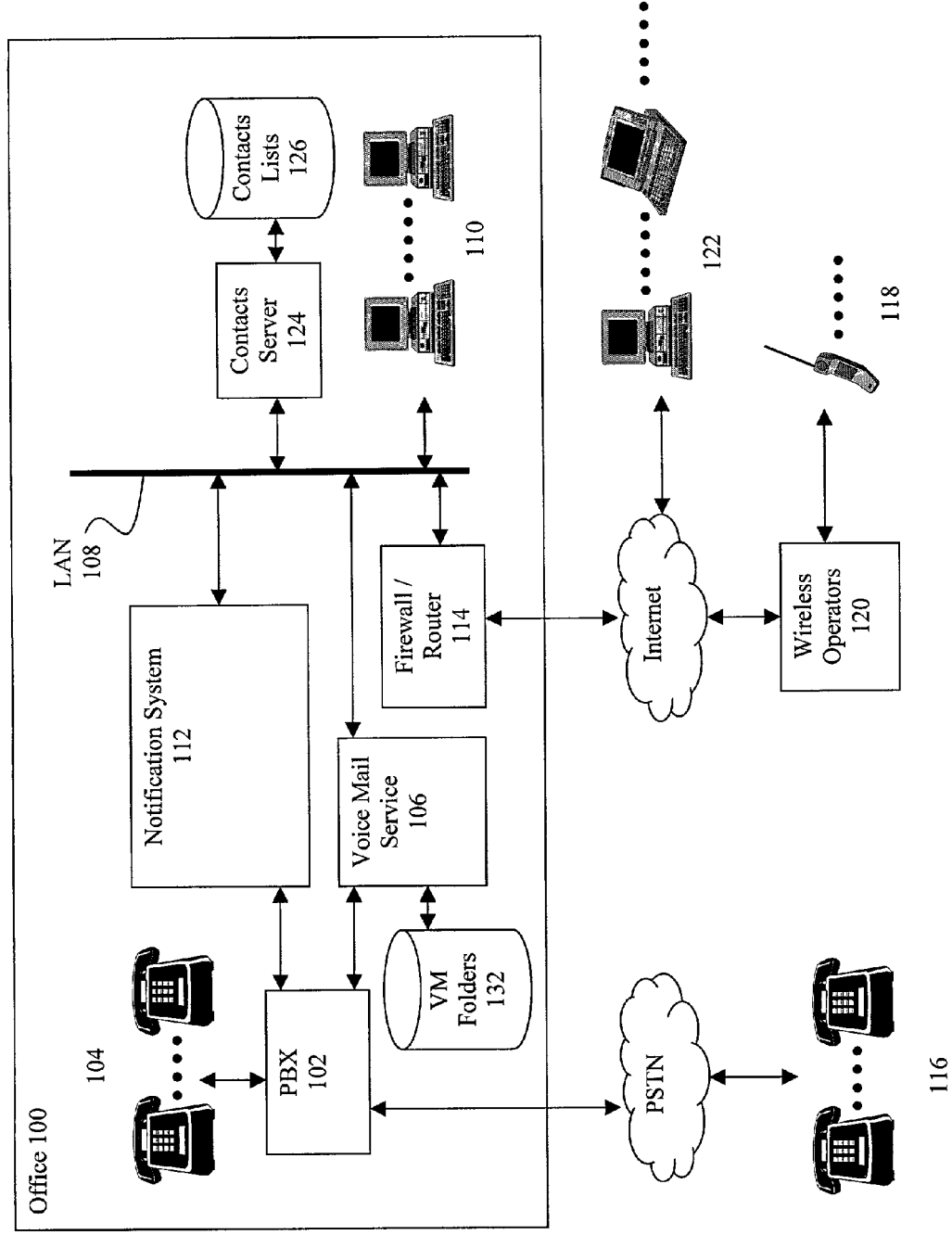
FIG. 1 illustrates an example topology for an implementation of the present invention in accordance with one embodiment.

FIG. 1 illustrates an example topology for an implementation of the present invention in accordance with one embodiment.

As can be seen, an office 100 (i.e. an enterprise) includes a PBX 102 that connects a plurality of office phones 104 and a voice mail (VM) service 106. The PBX 102 can be, for example, a Meridian 1™ PBX switch from Nortel Networks. The VM service 106 can be, for example, a CallPilot™ messaging system from Nortel Networks. In one example, VM service 106 maintains voice mailboxes in folders 132 for each of the phones 104, which mailboxes may be identified with the same phone numbers associated with phones 104 (e.g. a 4 or 5 digit extension), and includes an Interactive Voice Response system (IVR) for interacting with, and thereby allowing callers to record and play messages to and from the mailboxes.

Office 100 further includes a local area network (LAN) 108 (such as an Ethernet LAN) that connects a plurality of office PCs 110 with a contacts server 124. Contacts server 124 can be implemented by a Microsoft Exchange Server, for example, and PCs 110 can include client functionality such as Microsoft Outlook for receiving, storing and manipulating information in contacts lists 126 via LAN 108. The VM service 106 is further coupled to the LAN 108. A notification system 112 in accordance with the present invention is further coupled to the PBX 102 and the LAN 108. The notification system 112 and VM service 106 both also communicate with PBX 102 to receive and handle phone calls from within and outside the office 100 via their respective IVRs.

The office 100 is coupled to the Public Switched Telephone Network (PSTN) via the PBX 102 and to the Internet via a firewall/router 114 (both connections may be accomplished using a common collection of lines, for example, as should be apparent to those skilled in the art). The office 100 is connected to a plurality of PSTN phones 116 via the PSTN and a plurality of Internet appliances 122 (e.g. a PC, laptop, handheld or other wired device having browser functionality for communicating with remote devices using conventional protocols such as HTTP) via the Internet. The office 100 is also connected via the Internet for providing text messages to a plurality of wireless devices 118 (e.g. one-way and two-way pagers, WAP and/or SMS-enabled cell phones and PDAs, etc.) via their wireless operators 120 (using protocols such as HTTP and SMTP, etc.). Preferably, the firewall/router 114 includes security extensions for providing secure access between the notification system 112 and wireless operators 120 via the Internet.

Generally, the present invention allows a user having a voice mail box within the office environment to receive notification of new messages (or only filtered ones thereof) on their wireless device such as a WAP-enabled cell phone. The notification can include header information of new messages received (e.g. person from/phone number from, time received, length of message) so that the user can determine which of the voice mails require more urgent attention. The present invention provides a wireless device interface (e.g. interface to a WAP-enabled PDA or a browser on a computer coupled to the notification server via a network such as the Internet) that allows the user to access and view the notification of messages received and to select only certain of the stored voice mails for listening. The notification can further include a link to a dialer application for automatically calling a light-weight voice mail interactive voice response (IVR) service of the notification system, which service allows the user to listen to only the certain stored voice mails that were previously selected by the user.

It should be noted that not all of the "office" components shown in FIG. 1 need be included in the invention, nor need they be located at the same physical site. For example, the components may be located in different buildings. Other configurations may include shared or "virtual" PBX functionality that is available to different customers, who may or may not be located in the same office space, or no PBX functionality need be included at all. Moreover, although the above describes an example implementation in which selective remote access to enterprise voice mails is provided, the invention is not so limited and selective remote access to other types of message feeds may be provided additionally and/or alternatively.

Figure 2:
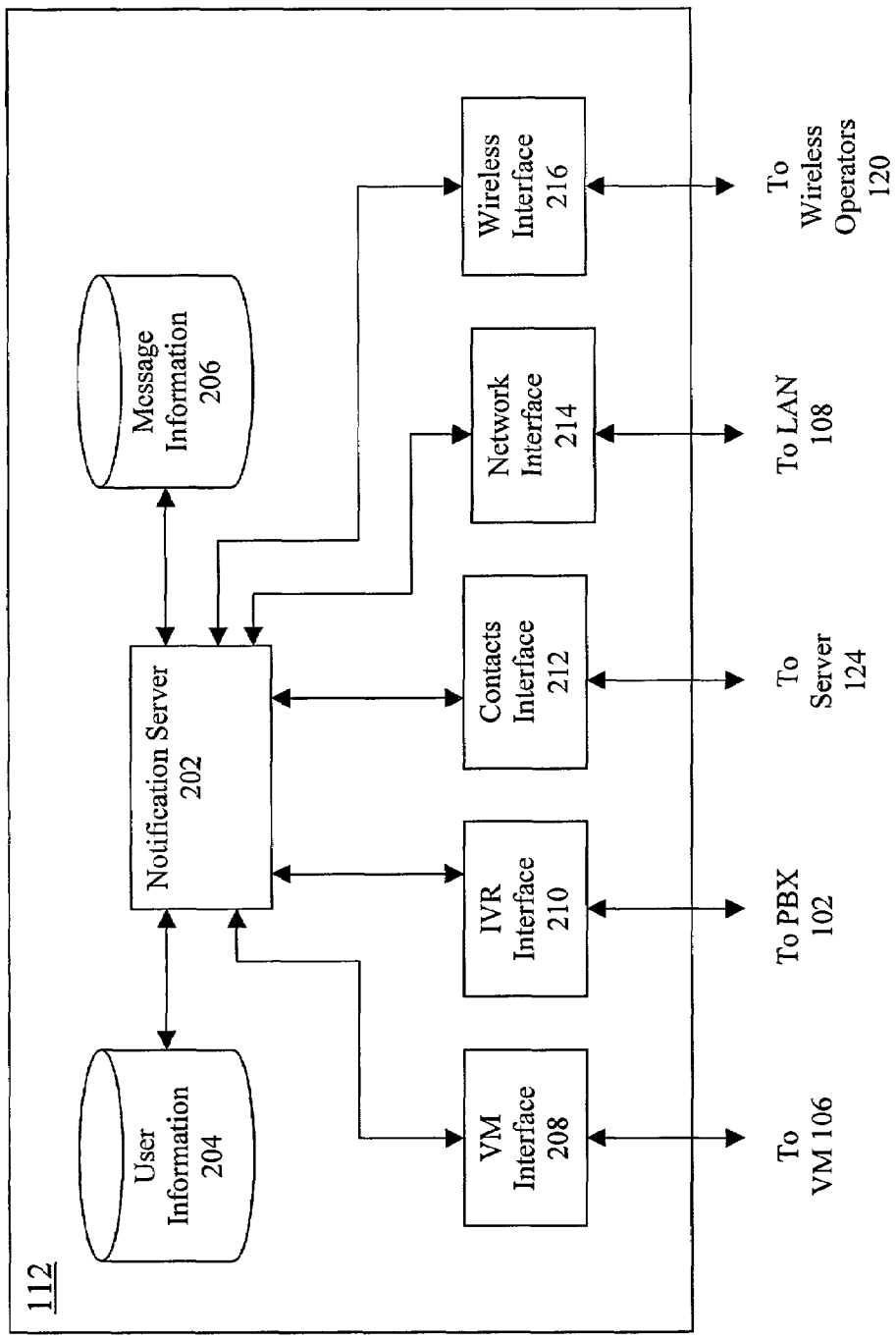
FIG. 2 illustrates an example of a notification system in accordance with an embodiment of the invention as illustrated in FIG. 1 in more detail.

FIG. 2 illustrates an example of a notification system in accordance with an embodiment of the invention in more detail. It should be noted that various alternatives to the system described below may exist, which alternatives may include fewer or additional components, all of which alternatives are within the scope of the present invention.

As shown in FIG. 2, a notification system 112 includes a notification server 202, a user information store 204, a message information store 206, a voice mail (VM) interface 208, an interactive voice response (IVR) interface 210 (e.g. including hardware and drivers such as that provided by Dialogic and software built on tools provided by Opus Maestro), a contacts interface 212, a network interface 214 (e.g. an Ethernet Interface) and a wireless interface 216.

In one example of the invention, the components of the notification system illustrated in FIG. 2 are commonly provided in a Windows NT server (e.g. a Compaq ProLiant series server computer running Windows NT 4.0), with certain of the components provided as add-in cards and certain other of the components provided as software modules, or combinations thereof. Although shown separately for clarity of the invention, it should be understood that the user information store 204 and the message information store 206 may be commonly provided in a relational database such as a Sybase SQL database. It should be further noted that other types of server platforms are possible.

It should be noted that the system can include administrator interface functionality and administrative information storage for providing underlying configurations that are used by the notification system, which configurations may or may not include information stored in user information store 204 (e.g. user names, associated desk phone numbers, associated mailbox numbers, desktop PC addresses, etc.) and wireless operator information (e.g. URLs to HTTP servers or e-mail servers associated with the operators, CLID unblocking information, etc.).

Generally, the notification server 202 continuously receives voice mail header information from VM service 106 via voice mail interface 208. When a new message for a user is received, notification server 202 causes the contacts interface 212 to look up contact information about the sender (e.g. the sender's name) from the user's personal contact list. The notification server 202 stores this message header information (including any additional sender information it could obtain) in message information store 206. Notification server 202 then, either spontaneously or in response to a request from the user, causes wireless interface 216 to send a notification to the user's wireless device (perhaps after verifying whether it is a priority message that the user is interested in knowing about) including a list of the messages received, which list also may be tailored depending on priorities and user preferences, and the header information associated with each message. Any additional content of the message notification may depend on what type of wireless device the user has configured and selected for receiving message notifications. For example, when a new voice mail is received for the user, and if the user has chosen to receive message notifications on a pager, the notification may only contain the name and phone number of the sender. On the other hand, if the chosen device is a WAP-enabled cell phone, notification server 202 may include URL links with which the user can automatically call the IVR interface 210.

User information in store 204 can include the user's office phone number and/or mailbox number (e.g. a four or five digit extension), the paths to where the user's contacts information is stored in the office (e.g. the paths to the user's folders in contacts lists 126 maintained by the server 124) the paths to where the user's voice mail messages are stored (e.g. the paths to the user's mailbox in VM folders 132 maintained by VM 106), the phone numbers/addresses of the user's devices and information concerning wireless operators for any of the devices that are wireless. It should be noted that the user may configure more than one device for receiving alerts, in which case the notification server 202 should include user interface functionality (e.g. an HTTP server for communicating with a user's browser via the LAN 108 or the Internet) for dynamically configuring or changing configurations of devices, and for allowing the user to select between the different devices, as well as the user's current indication of whether to receive alerts via any of the devices. The information in store 204 can further include an indication of the user's status and/or whether or not the user is presently interested in receiving message notifications.

Moreover, the information in store 204 can include filters for determining what types of messages the user is interested in receiving notifications about. These filters can be based on the identity of the sender of the message and/or the contents of the message (e.g. keywords in the subject line, or a priority flag in the message), for example. In this event, the notification server 202 can also include user interface functionality (e.g. an HTTP server for communicating with a user's browser via the LAN 108 or the Internet) for allowing the user to configure and/or change their message notification filters and/or preferences.

Message information in store 206 can include the header information (e.g. a unique identifier of the message, person from/phone number from, time received, length of message) of new messages received for each user (and perhaps after filtering in accordance with user preferences from store 204). Notification server 202 continually updates this information in response to voice mails received by the voice mail service 106 and forwarded to the notification server from VM interface 208. It should be noted that in addition to information about new messages received, the voice mail service 106 can provide information about voice mail messages that have been listened to and/or deleted by the user, in response to which information the notification server can delete the header information associated with such messages.

Voice mail interface 208 communicates with VM service 106 via TCP and using a standard messaging interface such as Internet Messaging Application Protocol (IMAP), for example. In an example of the invention where the VM service 106 is a CallPilot unified messaging system, such a system can be configured to send voice mail header information for selected mailboxes to a networked or otherwise connected device such as notification server 202. The header information may include, for example, the phone number of the caller who left the message (which may only be available for in-office phone messages, or from phones with which caller ID information was available), the time the message was received, and the length of the message. The header information may further include an indication of whether the caller marked the voice mail message as urgent, and a unique identifier of the voice mail by which it is stored in voice mail folders 132. Notification server 202 can use this received header information to compare against filters established by the user to determine whether a notification about the associated voice mail should be sent.

Voice mail interface 208 is the component of the notification system that interfaces with the network or connection for receiving the voice mail header information and for forwarding the received information to the notification server 202. Voice mail interface 208 further communicates with VM service 106 to retrieve and play back stored voice mail messages in response to user selections via the IVR interface 210, as well as to request deletion or other handling of stored voice mail messages as will be explained in more detail below.

Contacts interface 212 communicates with contacts server 124 via the LAN 108 and an interface such as the Messaging Application Programming Interface (MAPI)/Collaboration Data Objects (CDO) from Microsoft or standard interfaces such as LDAP or IMAP to attempt to learn more information about persons who leave messages. For example, when a new message is received and forwarded to notification server 202 by VM interface 208, notification server 202 extracts the phone number associated with the sender of the message (if any is received from VM interface 208) from the header information. Notification server 202 also gets the path information from user information store 204 to the user's contacts list maintained by the contacts server 124. The notification server 202 provides this path information, along with the phone number of the sender of the message (if any could be obtained) to the contacts interface 212. The contacts interface 212 then uses this information to query the contacts server 124 for any matching entries in the user's contacts list, and if there is a matching contact entry, it retrieves the name associated with that phone number from the contacts server 124 and returns this information to the notification server 202. Notification server 202 can then use this contact information to augment the voice mail header stored in message information store 206.

It should be noted that the contacts interface 212 needs to be configured with the address of the contacts server 124 in the LAN 108. Moreover, although in this example of the invention the contacts interface 212 communicates with a Microsoft Exchange Server using MAPI/CDO, it should be apparent that the contacts interface 212 may be configured differently or additionally to communicate with other types of systems in which a user's contact lists are maintained (e.g. LDAP).

Network interface 214 includes server functionality for interacting with clients in PCs 110 (e.g. using TCP protocol) and Internet PCs or devices 122 (e.g. using HTTP protocol). Such server-client functionality can include the ability to request and display the user's voice mail header information from store 206 via server 202. Such server-client functionality can further include the ability to play back selected messages. For example, the list of voice mail headers may each have associated URLs that point to a script (e.g. CGI or servlet) application of notification server 202 that causes the notification server 202 to retrieve a .WAV file associated with the message from the VM service 106 (assuming the VM service can provide such files) via voice mail interface 208 and to stream it to the client via the network interface 214. It should be noted that the network interface can further include functionality for allowing the user to delete messages, and/or perform other types of mailbox maintenance functionality, and the notification server can cause the selected actions to be requested from the VM service 106 via the voice mail interface 208.

Wireless interface 216 may include similar server functionality such as that discussed above for interacting with clients in wireless devices 118 (e.g. using WML pages exchanged over HTTP protocol between system 112 and wireless operators 120 via the Internet, and then exchanged over WTP protocol between the wireless operators 120 and the wireless devices 118). Additionally or alternatively to the server-client functionality provided by network interface 214 for allowing a wireless user to request and display the user's voice mail header information, the server-client functionality provided by wireless interface 216 can include allowing a user to select which of the voice mail messages to be played back upon a subsequent phone call by the wireless device to the IVR interface 210. For example, when sending a list of voice mail headers to a wireless device such as an Internet-ready cell phone, the page sent by wireless interface 216 will cause the list to be displayed on the wireless device, as well as checkboxes next to each of the listed headers and a "Play Selected" button (either simultaneously with the list of voice mails or after a user has check certain of the checkboxes). The "Play Selected" button will cause a message to be sent back to wireless interface 216 containing an indication of the voice mail headers for which an associated checkbox was marked by the user on the wireless device, which indications will be forwarded to the notification server. The "Play Selected" button will further cause a dialing application to be launched on the wireless device that will dial a number associated with the IVR interface 210. As will be described in more detail below, when the wireless device connects with the IVR interface 210, the notification server retrieves the user's voice mail selections and then retrieves the associated voice mails from VM service 106 via VM interface 208. The notification server then causes the selected voice mails to be played back to the user via the IVR interface 210.

Additionally or alternatively to providing server-client functionality for allowing a user to request notifications of their voice mail messages, notification server 202 can further causes message notifications to be spontaneously pushed via wireless interface 216 to the user's wireless device via an Internet gateway for the wireless operator associated with the specified wireless device. The wireless interface 216 pushes message notifications in a different manner based on the type of device on which they will be received. For example, where the wireless device is a WAP-enabled device (e.g. an Internet-ready cell phone), the wireless interface 216 may use the WAP Push protocol, in which the messages are posted as XML/WML/HDML documents using an HTTP protocol in accordance with a document type definition (DTD). Where the wireless device to receive the message is a one-way or two-way pager or PDA, the wireless interface may send the message to the wireless device gateway using the appropriate pager or wireless protocol.

As should be apparent, in order to access these devices for messaging, the system needs to be configured to recognize and communicate with the associated wireless operator for transferring text messages. For example, the system may be configured with the Internet address of the operator through which text messages are to be sent from the system using an HTTP or SMTP protocol. Users can be permitted to receive messages only with devices that are associated with these pre-configured operators. Additionally or alternatively, the wireless operator may need to provide functionality for understanding WAP Push feeds and for displaying them on the device.

As should be apparent from above, the content of the spontaneous notification message may depend on the type of wireless device the user has configured and selected for receiving message notifications. For example, if the user has chosen to receive message notifications on a pager, the message may only contain the name and phone number of the sender. On the other hand, if the chosen device is a WAP-enabled cell phone, notification server 202 may cause wireless interface 216 to include in the notification checkboxes and a "Play Selected" button by which the user can launch an application to dial the IVR interface 210 and allow the user to listen to the messages selected on the cell phone.

IVR interface 210 is a lightweight IVR system that is programmed and configured in accordance with the present invention. A user can access the IVR interface 210 through a dialed phone number in the office 100 or through the PSTN. When the phone number is dialed through the "Play Selected" button on a user's wireless device, the dialed sequence provided by the wireless interface 216 will preferably also include an "unblock CLID" prefix that causes the CLID information for the cell phone to be unblocked by the wireless operator if necessary. The "unblock CLID" prefix may vary per wireless operator and may be retrieved from user information store 204 by wireless interface 216. Accordingly, IVR interface 210 will be able to determine the phone number of the wireless device that has been connected to IVR interface 210 by the PBX 102. IVR interface 210 forwards the CLID information to notification server 202, which uses it to look up the user associated with the CLID. Once the user is known, the user's selections of voice mails to be played is also known (as determined from the message sent from the wireless device in accordance with the marked checkboxes via the wireless interface 216). The notification server 202 then uses these selections to retrieve the corresponding voice mail messages from VM service 106 via VM interface 208. The selected messages are then played to the user via the VM interface 208.

It should be noted that the IVR interface can simply cause the selected voice mail messages to be sequentially played back, one after another, if more than one has been selected. Additionally or alternatively, the IVR interface may include basic playback functions such as fast forward, reverse, and skip. It should be further noted that the IVR interface can be further programmed to allow the user to delete messages, and/or perform other types of mailbox maintenance functionality, and the notification server can cause the selected actions to be requested from the VM service 106 via the voice mail interface 208. Moreover, after the messages have been listened to by the user, IVR interface may inform notification server 202 such that the messages are deleted from the list of messages maintained for the user in message information store 206.

Figure 3:
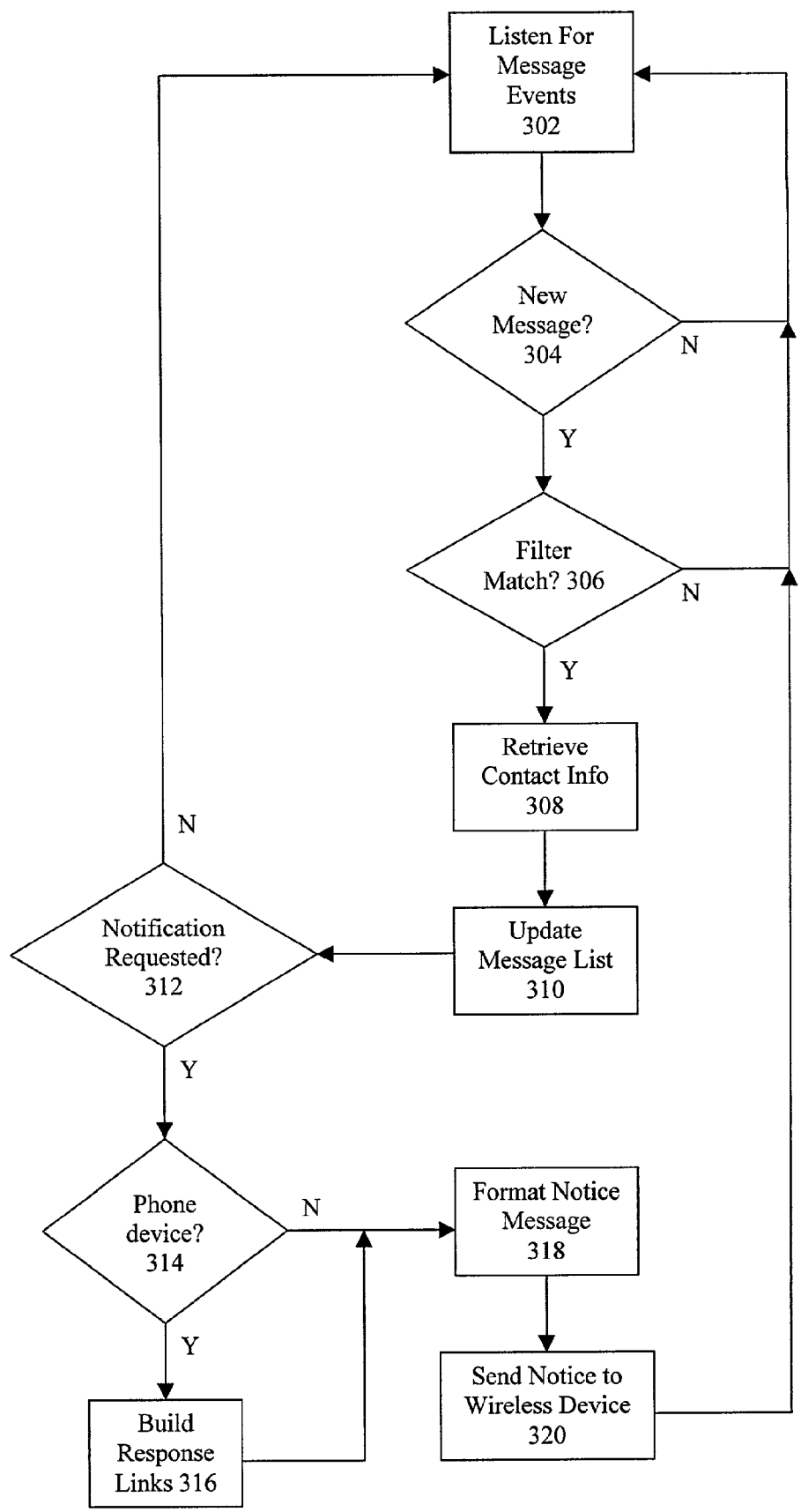
FIG. 3 is a flowchart illustrating an example method of providing notification of incoming messages to a wireless device associated with a user, which method can be implemented in a notification system in accordance with one embodiment of the present invention.

FIG. 3 is a flowchart illustrating an example method of providing alerts to a user's wireless device of incoming messages in accordance with an embodiment of the present invention. The processing described in the example below is only for one user. However, it should be apparent that the system can perform similar processing for multiple users simultaneously.

As shown in FIG. 3, processing begins in block 302 where the system retrieves the user information from store 204, and configures VM interface 208 to determine whether information for any new voice mail messages associated with the user have been forwarded to the notification system by the VM service, for example by subscribing to voice mail events associated with the user's voice mailbox. This block can also include determining whether the user has selected to receive any message notifications at all in accordance with a current status, for example. If not, processing can pause at this block until the user has indicated that message notifications should be provided.

If a new message has been received (determined in block 304), processing advances to block 306. Otherwise, processing returns to block 302. It should be noted that message events other than a new message received can occur, and that will require similar processing as described below. For example, if the user has deleted or listened to a voice mail, a message event will be triggered which may or may not cause the notification server 202 to update the list of voice mail messages pending for notification to the user.

In block 306, processing is performed to determine whether the new message is a type that the user is interested in receiving a notification about. There can be many ways that this determination is made. For example, the user may have configured his personal settings such that only messages marked urgent or only messages from certain priority contacts will result in a notice sent to the user. If the former, the notification system may need to compare the originating phone number with phone numbers associated with high priority callers that the user has configured. If the latter, the notification system may look at the header information to see if the caller marked the voice mail as urgent. It should be apparent that the user may also configured his settings so that a notice of all new messages is sent. If the new message is not a candidate for notification, processing returns to block 302. Otherwise, processing advances to block 308.

In block 308, an attempt is made to supplement the header information of the new message with as much identification of the sender as possible. This is done by extracting contact information associated with the sender from the user's personal contacts list or from other system directories. The received voice mail header information, whether or not supplemented, is then used to update the list of voice mail messages associated with the user in message information store 206.

Processing next advances to block 312 where it is determined whether a notification of the updated list of voice mail messages should be sent. This can be done by pre-configuration, by user preferences, or in response to user requests. For example, the system may be pre-configured to send notifications to all users immediately when a new message is received, or periodically after a predetermined period of time has elapsed (e.g. 15 minutes). Alternatively, such parameters can be changed for each user by user preference. Additionally or alternatively, notifications of received messages may be sent upon user request. If no notification is to be sent, processing returns to block 302. Otherwise, processing advances to block 314.

In block 314, it is further determined what type of wireless device the user has configured and selected for receiving message notifications. If the device is a type that can only display text (e.g. a one-way pager), then no further information will be added to the notification. Otherwise (e.g. the wireless device is a WAP-enabled cell phone), processing advances to block 316, where links for launching a dialer application is prepared for including in the message, which dialer application will automatically cause the wireless phone to be connected to the IVR service of the notification system, enabling a simple one-click response action on the user's part.

Processing advances to block 318, where the notification message is prepared with any additional information or links that the notification system was able to include in the message, and in block 320 the notification system forwards the notification to the user's wireless device. This block can include retrieving the user's device configuration and carrier settings from user information store 204 and providing this information to the wireless interface 216. The processing performed by wireless interface 216 can depend on the type of wireless device that the user has configured and selected for receiving notifications, and whether the notification is spontaneous or upon user request. In an example where the wireless device is a WAP-enabled cell phone, WAP push protocol may be used to send a spontaneous notification to the user's wireless device. This includes posting XML encoded documents using HTTP protocol. After the message alert is sent, processing returns to block 302.

Figure 4:
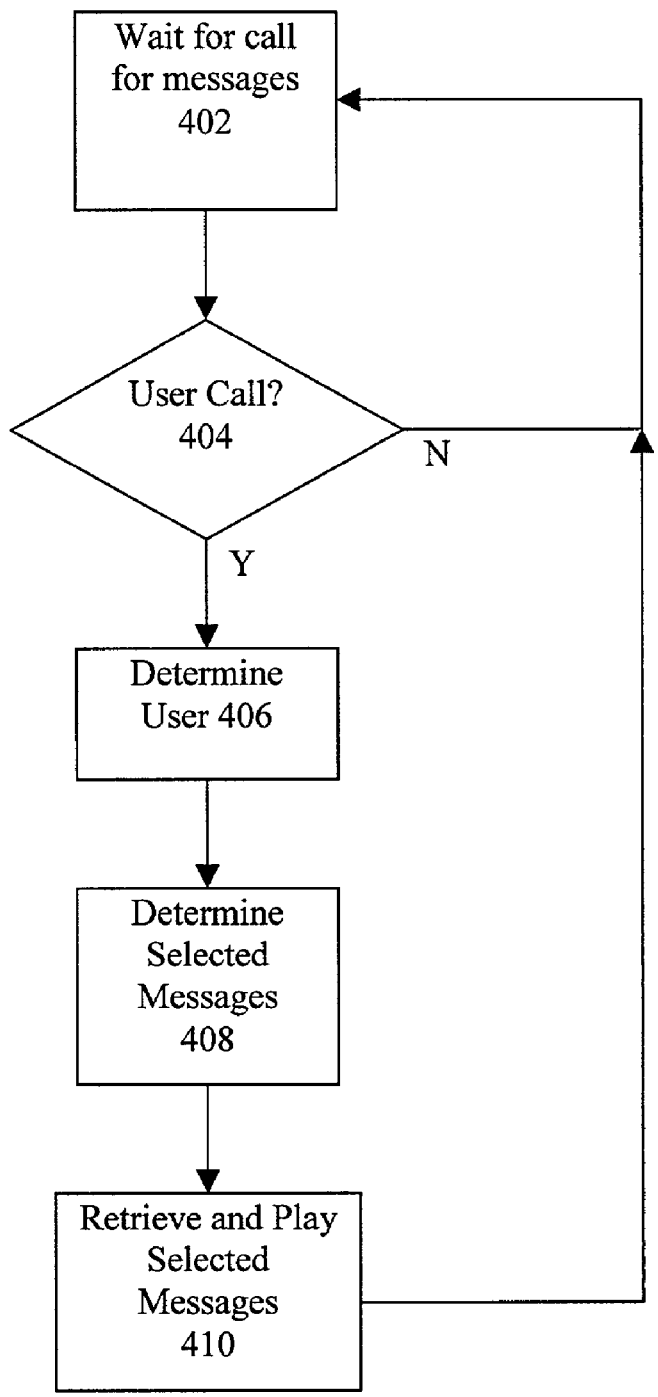
FIG. 4 is a flowchart illustrating an example method of allowing a user to selectively access voice mail messages.

FIG. 4 is a flowchart of an example method of allowing a user to selectively access voice mail messages from the user's stored enterprise voice mails in accordance with an embodiment of the present invention.

As shown in FIG. 4, processing begins when a call to the phone number associated with the IVR interface 210 of the notification system is received (as determined in block 404). When a user calls the system, the IVR interface gets the user's identification by, for example, associating the CLID information of the call with phone number information of each user stored in user information store 204 (block 406). The notification system then checks to see whether the user previously submitted any message selections to the system, for example by marking checkboxes next to selected voice mail messages and sending the selections back to the notification server via the wireless interface 216 (block 408). Processing continues to block 410 where the notification server retrieves the selected voice mail messages from VM service 106 (by requesting the message by its unique identifier provided in the voice mail header, for example), and then plays them back sequentially to the user via the IVR interface 208. When the user disconnects from the IVR interface 208, processing returns to block 402.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method for managing voice messages provided by callers to a user in an enterprise, the method comprising the steps of:
   receiving header information concerning a new voice message associated with the user in the enterprise;
   updating a list of message information for the user based on the received header information;
   extracting data from the new message regarding a sender of the new message;
   retrieving information which identifies a caller from a contact list maintained in the enterprise by employing the extracted data;
   preparing a notification based on the updated list of message information, including the information which identifies the caller; and
   sending the notification to a wireless device associated with the user.

2. A method according to claim 1, wherein the new message is a new voice mail message received in a mail box associated with the user in a voice mail service in the enterprise.

3. A method according to claim 2, further including a PBX, and wherein the mail box is further associated with a PBX phone associated with the user.

4. A method according to claim 2, wherein the step of receiving the header information includes the step of communicating with the voice mail service in the enterprise.

5. A method according to claim 1, further comprising the step of:
   determining a type of the wireless device associated with the user, the step of preparing the notification being further based on the determined type of the wireless device.

6. A method according to claim 5, wherein the step of sending the notification is performed in accordance with the determined type of the wireless device.

7. A method according to claim 1, wherein the step of retrieving the caller data includes the step of communication with a contacts server in the enterprise.

8. A method according to claim 7, further comprising the step of determining a path to a message folder associated with the user maintained by the contacts server, the step of communicating with the contacts server being performed in accordance with the determined path.

9. A method according to claim 1, further comprising the steps of:
   providing an identifier associated with each message in the updated list in the notification; and
   allowing the user to access a selected one of the messages in the updated list in accordance with the identifier.

10. An apparatus for managing voice messages provided by callers to a user in an enterprise, the apparatus comprising:
    means for receiving header information concerning a new voice message associated with the user in the enterprise;
    means for updating a list of message information for the user based on the received header information;
    means for extracting data from the new voice message regarding a sender of the new message;
    means for retrieving information which identifies a caller from a contact list maintained in the enterprise by employing the extracted data;
    means for preparing a notification based on the updated list of message information, including the information which identifies the caller; and
    means for sending the notification to a wireless device associated with the user.

11. An apparatus according to claim 10, wherein the new message is a new voice mail message received in a mail box associated with the user in a voice mail service in the enterprise.

12. An apparatus according to claim 11, further comprising a PBX, and wherein the mail box is further associated with a PBX phone associated with the user.

13. An apparatus according to claim 11, wherein the means for receiving the header information includes means for communicating with the voice mail service in the enterprise.

14. An apparatus according to claim 10, further comprising:
    means for determining a type of the wireless device associated with the user, the means for preparing the notification being further operative based on the determined type of the wireless device.

15. An apparatus according to claim 14, wherein the means for sending the notification is performed in accordance with the determined type of the wireless device.

16. An apparatus according to claim 10, wherein the means for retrieving the caller data includes means for communicating with a contacts server in the enterprise.

17. An apparatus according to claim 16, further comprising means for determining a path to a message folder associated with the user maintained by the contacts server, the means for communicating with the contacts server being operative in accordance with the determined path.

18. An apparatus according to claim 10, further comprising:
    means for providing an identifier associated with each message in the updated list in the notification; and
    means for allowing the user to access a selected one of the messages in the updated list in accordance with the identifier.

19. An apparatus for managing voice messages in an enterprise including a messaging system adapted to store voice mail messages of callers to a user, the apparatus comprising:
    a notification server adapted to be coupled to the messaging system for receiving header information regarding new voice mail messages associated with the user, the notification server being adapted to maintain a list of voice mail messages in accordance with the received header information and to send a notification based on the maintained list to a wireless device associated with the user; and
    a contacts server coupled to the notification server, the contacts server adapted to store contact information in folders, at least one of the folders being associated with the user, the notification server being further adapted to retrieve sender data from the contacts server in accordance with a sender identifier in the received header information and to provide the sender data in the notification.

20. An apparatus according to claim 19, further comprising a wireless interface for receiving selections from an updated list from the wireless device.

21. An apparatus according to claim 20, further comprising an interactive voice response interface for allowing the user to listen to selected ones of the voice mail messages from the updated list in accordance with the received selections.

22. An apparatus according to claim 19, wherein the enterprise further includes the contacts server coupled to the notification server, the contacts server adapted to store contact information in folders, at least one of the folders being associated with the user, the notification server being further adapted to retrieve sender data from the contacts server in accordance with a sender identifier in the received header information and to provide the sender data in the notification.

23. An apparatus according to claim 19, wherein the notification is sent in accordance with a determined type of the wireless device.

24. An apparatus according to claim 19, wherein the notification is prepared based on a determined type of the wireless device.

25. An apparatus according to claim 19, further comprising an interactive voice response interface for allowing the user to listen to selected ones of the voice mail messages from an updated list.

* * * * *

UNITED STATES PATENT AND TRADEMARK OFFICE
CERTIFICATE OF CORRECTION

| | |
|---|---|
| PATENT NO. | : 6,970,906 B1 |
| APPLICATION NO. | : 09/753025 |
| DATED | : November 29, 2005 |
| INVENTOR(S) | : Parsons et al. |

It is certified that error appears in the above-identified patent and that said Letters Patent is hereby corrected as shown below:

Column 11, line 49, delete "communication" and insert therefore --communicating--.

Column 12, line 33, delete "10" and insert therefore --11--.

Signed and Sealed this

First Day of August, 2006

JON W. DUDAS
*Director of the United States Patent and Trademark Office*